US012073666B1

(12) United States Patent
Monaghan et al.

(10) Patent No.: US 12,073,666 B1
(45) Date of Patent: Aug. 27, 2024

(54) SYSTEMS AND METHODS FOR INTEGRATED DIAGNOSTICS OF REAL-TIME DRIVING CHARACTERISTICS

(71) Applicant: MONLIZ LLC, Sacramento, CA (US)

(72) Inventors: Robert Monaghan, Ventura, CA (US); Lee Lizarraga, Ventura, CA (US)

(73) Assignee: MONLIZ LLC, Sacramento, CA (US)

( * ) Notice: Subject to any disclaimer, the term of this patent is extended or adjusted under 35 U.S.C. 154(b) by 0 days.

(21) Appl. No.: 18/500,772

(22) Filed: Nov. 2, 2023

(51) Int. Cl.
 *G07C 5/00* (2006.01)
 *B60C 11/24* (2006.01)
 *G01B 21/26* (2006.01)
 *G07C 5/08* (2006.01)

(52) U.S. Cl.
 CPC ............ *G07C 5/008* (2013.01); *B60C 11/243* (2013.01); *B60C 11/246* (2013.01); *G01B 21/26* (2013.01); *G07C 5/0808* (2013.01); *G07C 5/0816* (2013.01); *B60C 2200/04* (2013.01); *G01B 2210/10* (2013.01); *G01B 2210/58* (2013.01)

(58) Field of Classification Search
 CPC .... G07C 5/008; G07C 5/0808; G07C 5/0816; B60C 11/243; B60C 11/246; B60C 2200/04; G01B 21/26; G01B 2210/10; G01B 2210/58
 See application file for complete search history.

(56) References Cited

U.S. PATENT DOCUMENTS

| | | | |
|---|---|---|---|
| 1,710,877 A * | 4/1929 | Kaye | F16T 1/24 137/186 |
| 6,684,691 B1 | 2/2004 | Rosseau | |
| 7,237,433 B2 | 7/2007 | Walenty et al. | |
| 11,338,627 B1 * | 5/2022 | McGillan | B60C 11/246 |
| 2003/0110850 A1 * | 6/2003 | Saheki | B60C 23/0408 73/146 |
| 2016/0109331 A1 * | 4/2016 | Kato | G01M 17/02 73/8 |
| 2017/0350684 A1 * | 12/2017 | Maliszewski | G01B 5/255 |
| 2018/0250991 A1 * | 9/2018 | Hrabal | B60C 23/123 |
| 2021/0237896 A1 * | 8/2021 | Bill | H04W 4/38 |
| 2022/0339978 A1 * | 10/2022 | Schroedel | B60Q 9/00 |

* cited by examiner

*Primary Examiner* — Harry Y Oh
(74) *Attorney, Agent, or Firm* — Ansari Katiraei LLP; Arman Katiraei; Sadiq Ansari

(57) ABSTRACT

A vehicle monitoring system includes a controller and one or more wheel-integrated monitoring devices that are each disposed between a wheel of a vehicle and a tire that is mounted to that wheel. The wheel-integrated monitoring device has multiple sensors, a transceiver, and a power unit. The sensors generate different measurements during each rotation of the wheel. The transceiver wirelessly transmits the different measurements to the controller. The power unit provides power to the sensors and the transceiver. The controller analyzes the measurements and generates alerts on a dashboard or console in response to the measurements revealing wheel alignment, tire tread, and/or other driving characteristics that differ from manufacturer specifications by more than a threshold amount or that present safety hazards to the driver.

20 Claims, 9 Drawing Sheets

SYSTEMS AND METHODS FOR INTEGRATED DIAGNOSTICS OF REAL-TIME DRIVING CHARACTERISTICS

BACKGROUND

Vehicles have many sensors to monitor the engine, electronics, and/or other components. These sensors may notify the driver of any components reporting faults or components that may be in need of repair. In other words, the sensors monitor the components and whether the components are operating according to expected parameters. The sensors do not monitor the driving characteristics of the vehicle. For instance, the sensors cannot monitor wheel alignment, other wheel states beyond the tire pressure, and/or other driving characteristics affected by the rotation or orientation of the wheels while the vehicle is in motion.

DETAILED DESCRIPTION OF PREFERRED EMBODIMENTS

The following detailed description refers to the accompanying drawings. The same reference numbers in different drawings may identify the same or similar elements.

Provided are systems and methods for integrated diagnostics of real-time driving characteristics. The integrated diagnostics are generated from one or more wheel-integrated monitoring devices and/or a controller that wireless communicates with the one or more wheel-integrated monitoring devices.

In some embodiments, the wheel-integrated monitoring devices are integrated into one or more vehicle wheels and/or are attached to the tire strainer valve (e.g., the valve for filling and ejecting air from the tires that are mounted to the vehicle wheels). The wheel-integrated monitoring devices measure various driving characteristics while the vehicle is in motion, and produce a real-time stream of data as to the measured driving characteristics. For instance, the wheel-integrated monitoring devices measure the arc-of-rotation, orientation, and/or other properties of the vehicle wheels.

The controller may determine the camber, toe, caster, and/or other wheel alignment characteristics associated with each wheel based on the measurements generated by the wheel-integrated monitoring devices. The controller may derive other driving characteristics from the generated measurements including the tire wear state, wheel balance, changes in vehicle traction, changes in gas mileage, and/or other changes affecting the performance of the wheels or vehicle.

In some embodiments, the controller generates alerts that notify the driver of safety issues due to the measured, determined, or derived driving characteristics. For instance, the controller may generate alerts regarding excessive wear on one or more tires or excessive drift that create unsafe driving characteristics.

In some embodiments, the controller may automatically adjust or tune the vehicle driving characteristics based on the generated and determined measurements. The controller automatically adjusts or tunes the vehicle driving characteristics to improve vehicle efficiency and/or performance. For instance, the controller may redistribute power to the wheel motors in order to reduce tire wear and/or improve tire life based on the angle or orientation with which the wheels ride on the road which may be indicative of the load on the wheels.

Figure 1:
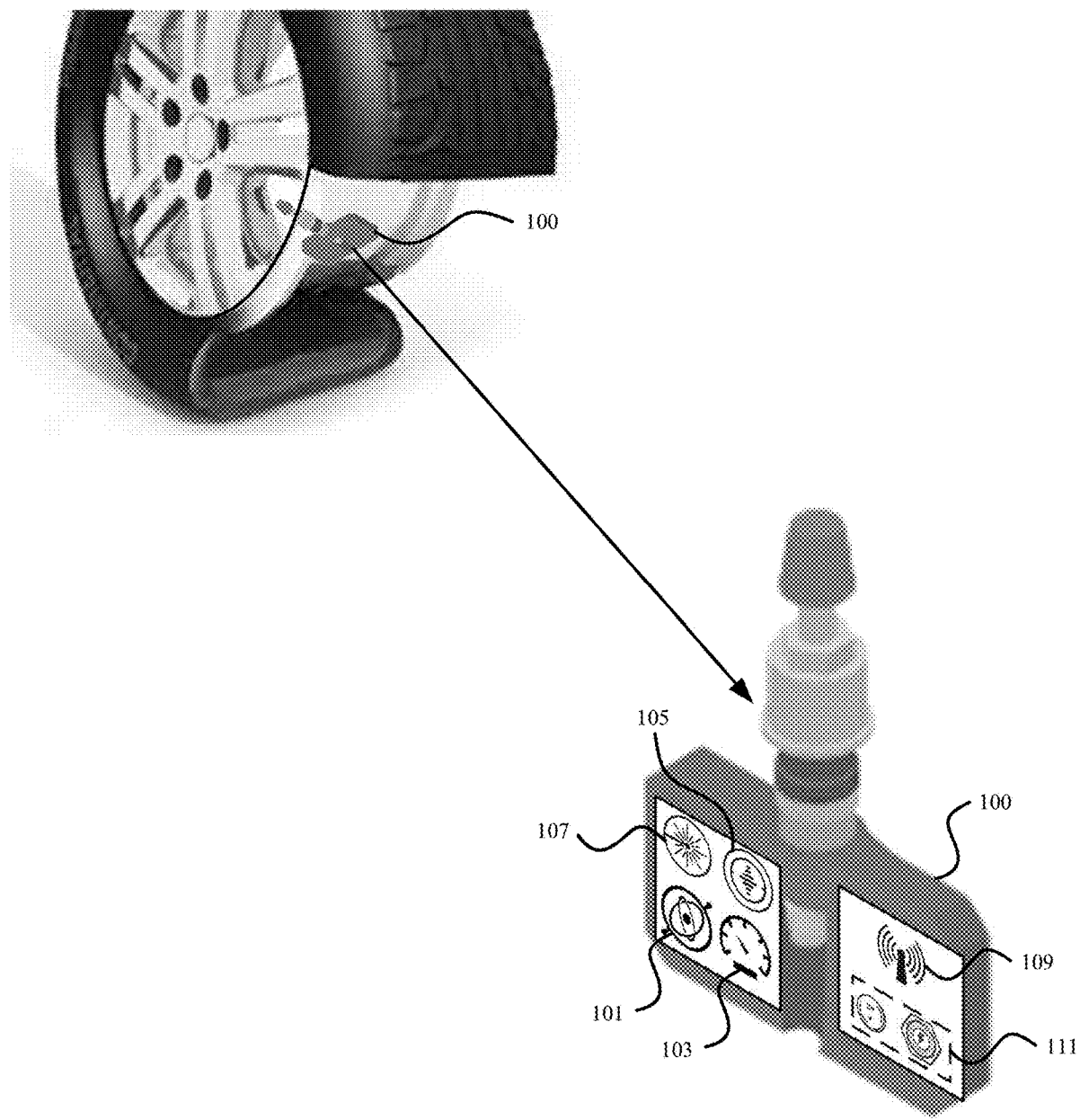
FIG. 1 illustrates an example of a wheel-integrated monitoring device in accordance with some embodiments presented herein.

FIG. 1 illustrates an example of a wheel-integrated monitoring device 100 in accordance with some embodiments presented herein. Wheel-integrated monitoring device 100 is integrated as part of the tire strainer valve. In other words, wheel-integrated monitoring devices 100 may be mounted, attached, or otherwise coupled to the tire strainer valve in a similar fashion as a tire pressure monitoring sensor ("TPMS"). For instance, the tire strainer valve nozzle extends through an opening in the wheel rim with the sensors of wheel-integrated monitoring device 100 being disposed between the rim and the tire that is placed over the rim.

In some embodiments, the TPMS is included as part of wheel-integrated monitoring device 100. In some other embodiments, wheel-integrated monitoring device 100 excludes or replaces the TPMS. Unlike the TPMS which generates a single measurement for a single vehicle component (e.g., the tire pressure), wheel-integrated monitoring device 100 generates multiple measurements for different driving characteristics of the vehicle while the vehicle is in motion. Stated differently, the tire pressure measurement generated by the TPMS relates to a property of the tire and is unrelated to how the vehicle drives (e.g., the vehicle driving characteristics), whereas wheel-integrated monitoring device 100 generates measurements for the rotation, orientation, and/or positioning of the vehicle wheels and tires which directly affect the vehicle driving characteristics.

Wheel-integrated monitoring device 100 includes inertial measurement unit ("IMU") 101, accelerometer 103, gyroscope 105, and/or other sensors 107 and/or integrated circuits for measuring the wheel's arc-of-rotation, acceleration, angular velocity, angle, orientation, height, and position while in motion. For instance, IMU 101 may measure acceleration, orientation, angular rates, and other gravitational forces of a wheel or tire mounted on the wheel. In some embodiments, accelerometer 103 and/or gyroscope 105 control the sampling rate of IMU 101. For instance, accelerometer 103 and/or gyroscope 105 may track the position of wheel-integrated monitoring device 100 relative to the wheel or road (e.g., at the bottom, bottom left, bottom right, top, etc. of the wheel) as the wheel rotates with the vehicle in motion, and may control IMU 101 in taking measurements when IMU 101 or wheel-integrated monitoring device 100 moves to the same set of positions (e.g., bottom left, bottom right, and top) during every wheel rotation. Accordingly, wheel-integrated monitoring device 100 may generate measurements that may be compared to one another, and that may be used to determine different loads on the wheels, calculate wear on the tires, changes in wheel alignment, and/or other driving characteristics.

Wheel-integrated monitoring device 100 also includes transceiver 109 and power unit 111. Transceiver 109 may include a Bluetooth, Bluetooth Low Energy, or other low-power radio for communicating with the controller, transferring data to the controller, and/or receiving commands or configuration data from the controller. In some embodiments, transceiver 109 may be used to directly offload the data from wheel-integrated monitoring device 100 to a user device such as a smartphone, tablet, or other wireless computing device. Power unit 111 may include a battery that continuously or selectively powers wheel-integrated monitoring device 100. For instance, power unit 111 may power accelerometer 103 when the vehicle is not moving, and may power all sensors once accelerometer 103 determines that the vehicle is in motion. In some embodiments, power unit 111 may include a rotational power generator (e.g., magnets) that generate power from the rotation of the vehicle wheel in a quantity that is sufficient to power the sensors and other components of wheel-integrated monitoring device 100 even with the vehicle moving at low speeds (e.g., 2 or more miles per hour).

Wheel-integrated monitoring device 100 may include a protective housing to protect the sensors and other components from environmental elements and/or shocks resulting from the vehicle driving on uneven roads at different various speeds. In some embodiments, the positioning of wheel-integrated monitoring device 100 within the interior of the tire on the tire strainer valve provides sufficient protection from the environmental elements.

In some embodiments, wheel-integrated monitoring device 100 is one or more centimeters in size and is rated to last longer than the expected life of the tire (e.g., over 7 years). In some embodiments, the sensors and other components of wheel-integrated monitoring device 100 are integrated onto a single printed circuit board or wafer to minimize power consumption, size, and potential for damaging the interconnects between the sensors and components.

Figure 2:
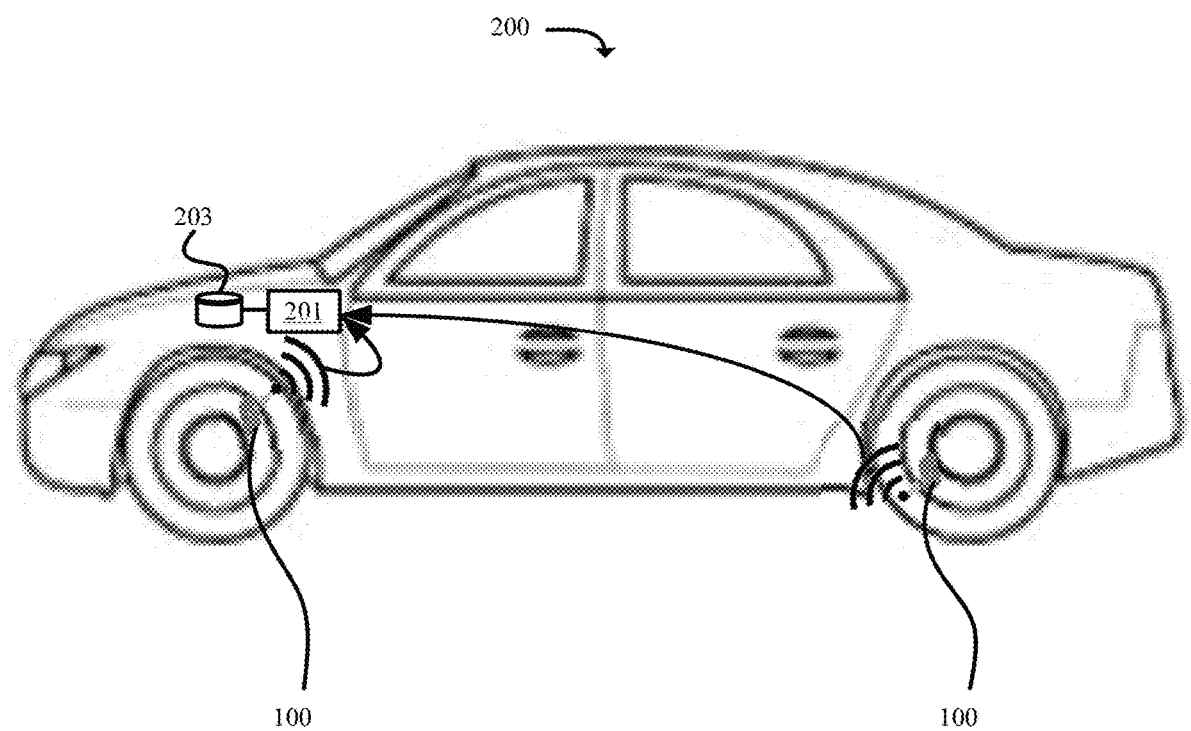
FIG. 2 illustrates an example monitoring system with the wheel-integrated monitoring devices in accordance with some embodiments presented herein.

FIG. 2 illustrates an example monitoring system 200 using wheel-integrated monitoring devices 100 in accordance with some embodiments presented herein. Example monitoring system 200 includes controller 201, non-volatile storage medium 203, and wheel-integrated monitoring devices 100.

Wheel-integrated monitoring devices 100 are integrated into each wheel, and wirelessly communicate with controller 201. Controller 201 may include one or more hardware processors and a transceiver that receive power when the vehicle is turned on. Controller 201 may be part of the vehicle's on-board electronic control unit ("ECU") or may be an after-market component that is separate from the ECU and/or that is added to the vehicle after assembly.

Controller 201 may pair with or establish a secure session with each wheel-integrated monitoring device 100 in order to receive diagnostic data or measurements from each wheel-integrated monitoring device 100 via its own transceiver. Each wheel-integrated monitoring device 100 may be configured with a different unique identifier and may provide that unique identifier with the data it sends to controller 201. Controller 201 may differentiate the data that is received for each wheel based on the unique identifier accompanying the data.

Controller 201 processes the data from each wheel-integrated monitoring device 100 to derive the driving characteristics of the vehicle. For instance, controller 201 may determine the wheel alignment based on caster, toe, and/or camber measurements that are derived from the wheel-integrated monitoring device 100 data. Controller 201 may determine wear on each tire from the wheel-integrated monitoring device 100 data. For instance, controller 201 may determine the average load on the wheels (e.g., number of passengers or overall weight), average acceleration, average velocity, and/or other driving characteristics based on the received wheel-integrated monitoring device 100 data and changes to that data over time.

Controller 201 may store the received wheel-integrated monitoring device 100 data and/or derived driving characteristics to non-volatile storage medium 203. Non-volatile storage medium 203 may store the received data and/or derived driving characteristics over the lifetime of the tires or vehicle. The data stored by non-volatile storage medium 203 may be downloaded onto a third-party device. For instance, a mechanic may download the data off non-volatile storage medium 203 to view the measured driving characteristics and determine adjustments to the vehicle that correct wheel misalignment, improve the driving characteristics, improve tire life, and/or improve vehicle efficiency or performance. Moreover, the vehicle manufacturer may receive data streams from the vehicles it manufactures that are equipped with wheel-integrated monitoring devices 100 and/or monitoring system 200, and may analyze those data streams to improve their vehicles.

In some embodiments, controller 201 may dynamically generate adjusted alignment specifications for the vehicle based on the derived average load, acceleration, speed, and/or other driving characteristics of the vehicle, and may output the adjusted alignment specifications to a mechanic performing the wheel alignment. For instance, the manufacturer defined alignment specifications may be based on the vehicle being weighted with a single driver and a full tank of gas. Controller 201 may adjust the manufacturer defined alignment specifications in response to determining, based on the angle, orientation, positioning, and/or other wheel data measured by wheel-integrated monitoring devices 100, that the vehicle is typically loaded more than the manufacturer defined alignment specifications, and that an increase or decrease in the wheel camber, toe, or caster may lead to longer tire life, better traction, improved gas mileage or efficiency, and/or improved performance.

In some embodiments, controller 201 may communicate with the vehicle EDC or safety system, and may generate alerts via lights on the dashboard or indicators on the vehicle console when the determined driving characteristics are outside acceptable tolerances or thresholds. For instance, controller 201 may determine that the wheel alignment is outside of manufacturer specifications by a threshold amount, and may generate an alert on the vehicle dashboard or console or on an application running on the driver device (e.g., driver's smartphone) that the vehicle tire may experience premature or excessive wear as a result of the wheel misalignment or that the wheel require alignment. Additionally, controller 201 may monitor the angle or position of the wheels relative to the road over time, may determine remaining tread life of the tires based on changes to the angle or positions of the wheels, and may generate an alert or reminder that one or more of the tires is excessively worn, has become unsafe, and/or is due for replacement.

In some embodiments, controller 201 is integrated with the vehicle drive system, and directly adjusts vehicle performance based on the determined driving characteristics. For instance, controller 201 may adjust the torque response and/or power distribution to different wheels when determining that the vehicle is loaded more or less than normal, when one or more wheels are out of alignment, and/or as the tires wear and lose traction. In so doing, controller 201 may improve gas mileage, tread life, efficiency, and/or performance of the vehicle dynamically over the life of the tires and in response to different detected conditions affecting the driving characteristics of the vehicle.

Figure 3:
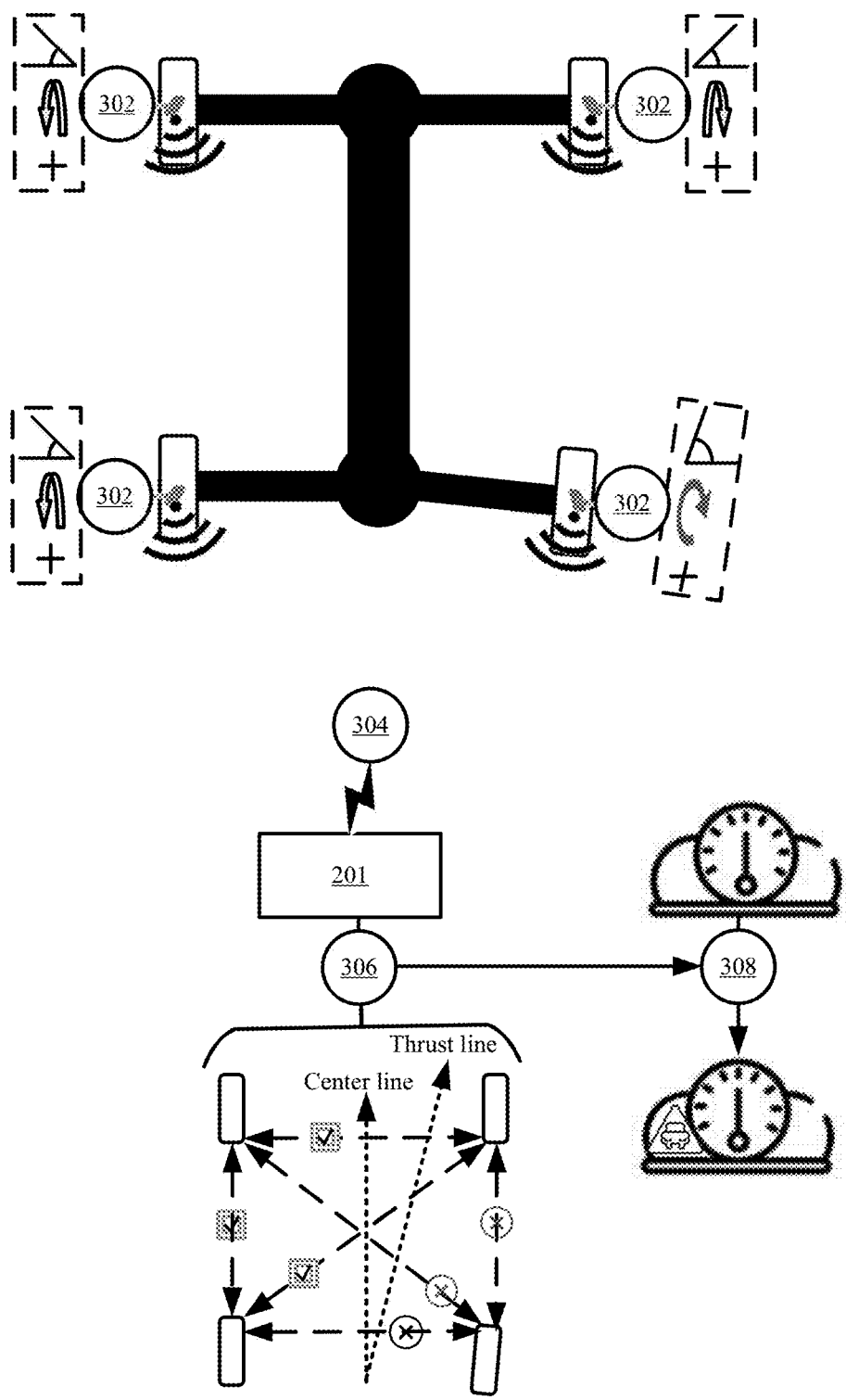
FIG. 3 illustrates example measurements for driving characteristics of a vehicle that are generated by the wheel-integrated monitoring devices in accordance with some embodiments presented herein.

FIG. 3 illustrates example measurements for driving characteristics of a vehicle that are generated by wheel-integrated monitoring devices 100 in accordance with some embodiments presented herein. Wheel-integrated monitoring device 100 is integrated in each vehicle wheel. As the vehicle is in motion (e.g., being driven), wheel-integrated monitoring devices 100 measure (at 302) the wheel's arc-of-rotation, angle, orientation, and/or position at the same points along each wheel rotation.

Each wheel-integrated monitoring device 100 wirelessly transmits the measurements to controller 201. Controller 201 receives (at 304) the measurements from each wheel-integrated monitoring device 100.

Controller 201 compares and/or analyzes the measurements to determine (at 306) anomalous driving characteristics. Controller 201 may determine (at 306) the anomalous driving characteristics by comparing the measurements from each wheel to one another, and detecting one or more measurements of one or more wheels that deviate from the measurements of other wheels by more than a threshold amount. For instance, controller 201 detects a misaligned wheel in response to the arc-of-rotation, angle, orientation, and/or position of a wheel being offset from the vehicle center line. The misaligned or offset wheel may be due to unseen structural damage to the vehicle after an accident or due to the wheel losing alignment as a result of normal driving and/or coming into contact with different bumps or road imperfections. Controller 201 may also determine (at 306) the anomalous driving characteristics by detecting one or more measurements from one or more wheels that are outside of manufacturer or vehicle specifications or acceptable tolerances. Controller 201 may be configured with the manufacturer or vehicle specifications or acceptable tolerances when it is installed on the vehicle. For instance, the installer may wirelessly connect to controller 201 with a user device, may specify the make and model of the vehicle, and the user device may download and install the manufacturer or vehicle specifications or acceptable tolerances into nonvolatile storage medium 203 or a storage of controller 201.

The misaligned wheel may make the vehicle unsafe to drive, may cause the vehicle to lose performance (e.g., increased fuel consumption, cause drift, etc.), may increase tread wear on the tires, and/or may change other driving characteristics of the vehicle. Accordingly, controller 201 may generate (at 308) an alert on the vehicle dashboard or console to notify the driver of the issue. For instance, controller 201 may activate a check engine light that indicates one or more of the wheels being misaligned. The driver may then take the vehicle to a repair shop for inspection or repair.

Figure 4:
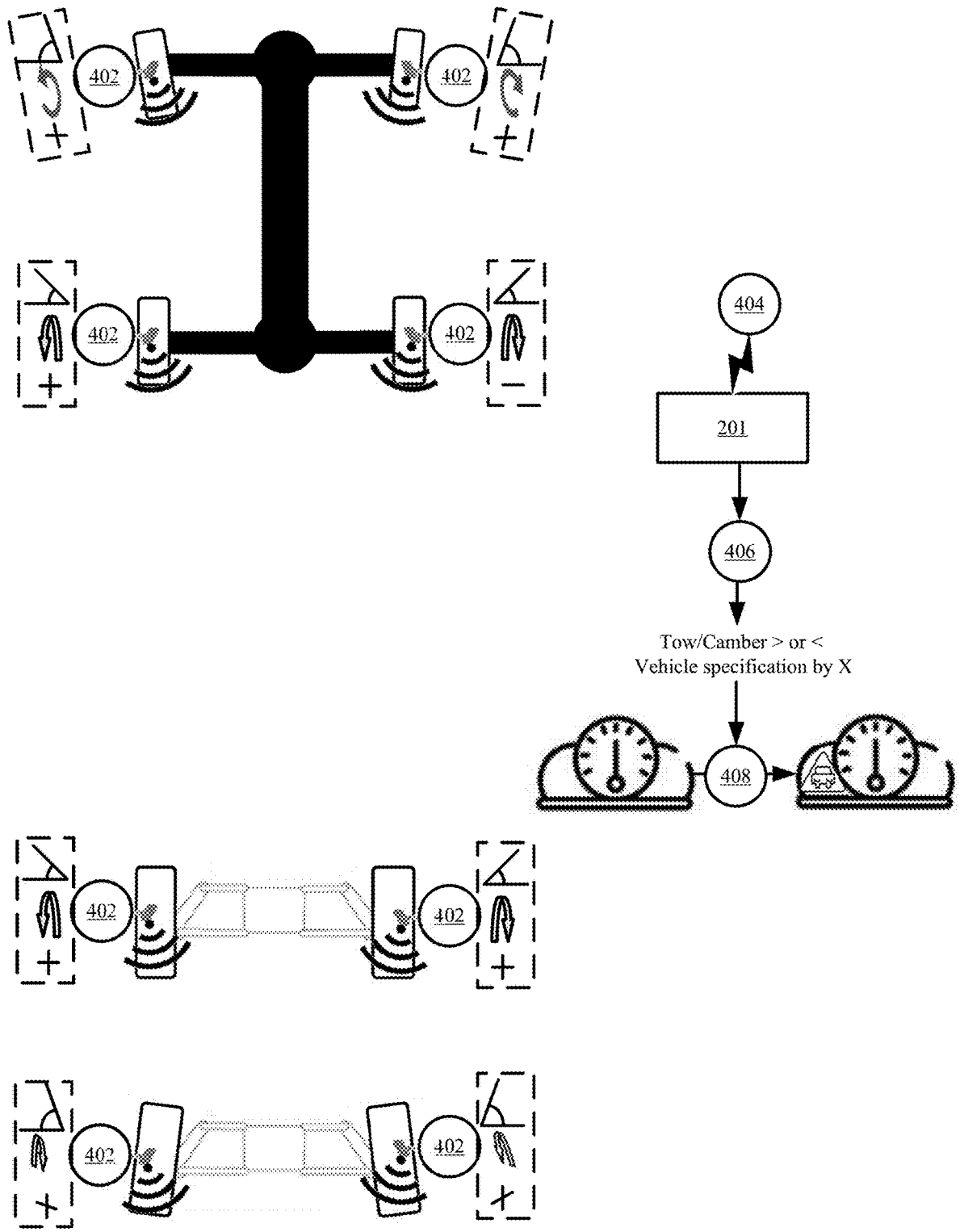
FIG. 4 illustrates examples of different deviating driving characteristics that are detected from the wheel-integrated monitoring devices measurements in accordance with some embodiments presented herein.

FIG. 4 illustrates examples of different deviating driving characteristics that are detected from the wheel-integrated monitoring devices 100 measurements in accordance with some embodiments presented herein. Wheel-integrated monitoring devices 100 measure (at 402) each wheel's arc-of-rotation, angle, orientation, and/or position at the same points along each wheel rotation, and transmit the measurements to controller 201.

Controller 201 receives (at 404) the measurements from each wheel-integrated monitoring device 100. Controller 201 compares and/or analyzes the measurements to determine (at 406) driving characteristics that are outside of manufacturer or vehicle specifications or acceptable tolerances. For instance, the arc-of-rotation, angle, orientation, and/or position of a wheel may have an inward or outward positioning that deviates by more than a threshold amount from the manufacturer or vehicle specified amount of wheel toe. Similarly, controller 201 also detects a misaligned wheel based on the arc-of-rotation, angle, orientation, and/or position of a wheel indicating that the angle or tilt of the wheel deviates by more than a threshold amount from the manufacturer or vehicle specified amount of wheel camber. In some embodiments, controller 201 also detects a misaligned wheel based on the arc-of-rotation, angle, orientation, and/or position of a wheel indicating that the wheel does not return to center or a straight position after a turn, and therefore has a caster that deviates by more than a threshold amount from the manufacturer or vehicle specified amount of caster.

Here again, the misaligned wheel may make the vehicle unsafe to drive, may cause the vehicle to lose performance (e.g., increased fuel consumption, cause drift, etc.), may increase tread wear on the tires, and/or may change other driving characteristics of the vehicle. Accordingly, controller 201 may generate (at 408) an alert on the vehicle dashboard or console to notify the driver of the issue.

The measurements received from wheel-integrated monitoring devices 100 while the vehicle is in motion provide a more accurate assessment of the wheel alignment than existing techniques that measure the wheel alignment while the vehicle is stationary or suspended on a lift. When suspended on a lift, there is no load on the wheels, and the load has an effect on the suspension connecting the wheels to the vehicle. Therefore, performing an alignment based on measurements taken from a stationary vehicle (e.g., a vehicle suspended on a lift) may yield different results than performing an alignment based on measurements taken while the vehicle is in motion with actual passenger loads distributed across the vehicle.

In some embodiments, controller 201 compares and/or analyzes the received measurements from a particular wheel-integrated monitoring device 100 to recorded measurements previously generated by that particular wheel-integrated monitoring device 100 in order to determine driving characteristics associated with the tire tread. Low tire tread is an issue that some drivers are unaware of. For instance, if a vehicle is running without issue, then the driver may feel there is no need to take the vehicle to a mechanic for inspection and the low tire tread may go unnoticed until it is too late. Similarly, a mechanic may perform one repair (e.g., an oil change) and not diagnose other potential issues such as low tire tread. Being unaware of low tire tread may also be caused by tires having a wide range of expected tread life (e.g., from 20,000 miles to 75,000 miles). Accordingly, some drivers expect their tires to last longer than warranted by the manufacturer. The driving behavior of the driver as well as a poorly maintained vehicle (e.g., wheels that are out of alignment) may contribute to premature or excessive wear on the tires. Accordingly, controller 201 may use the data from wheel-integrated monitoring devices 100 to notify the driver when it is time to replace the tires and/or other safety issues related to the vehicle wheels and tires.

Figure 5:
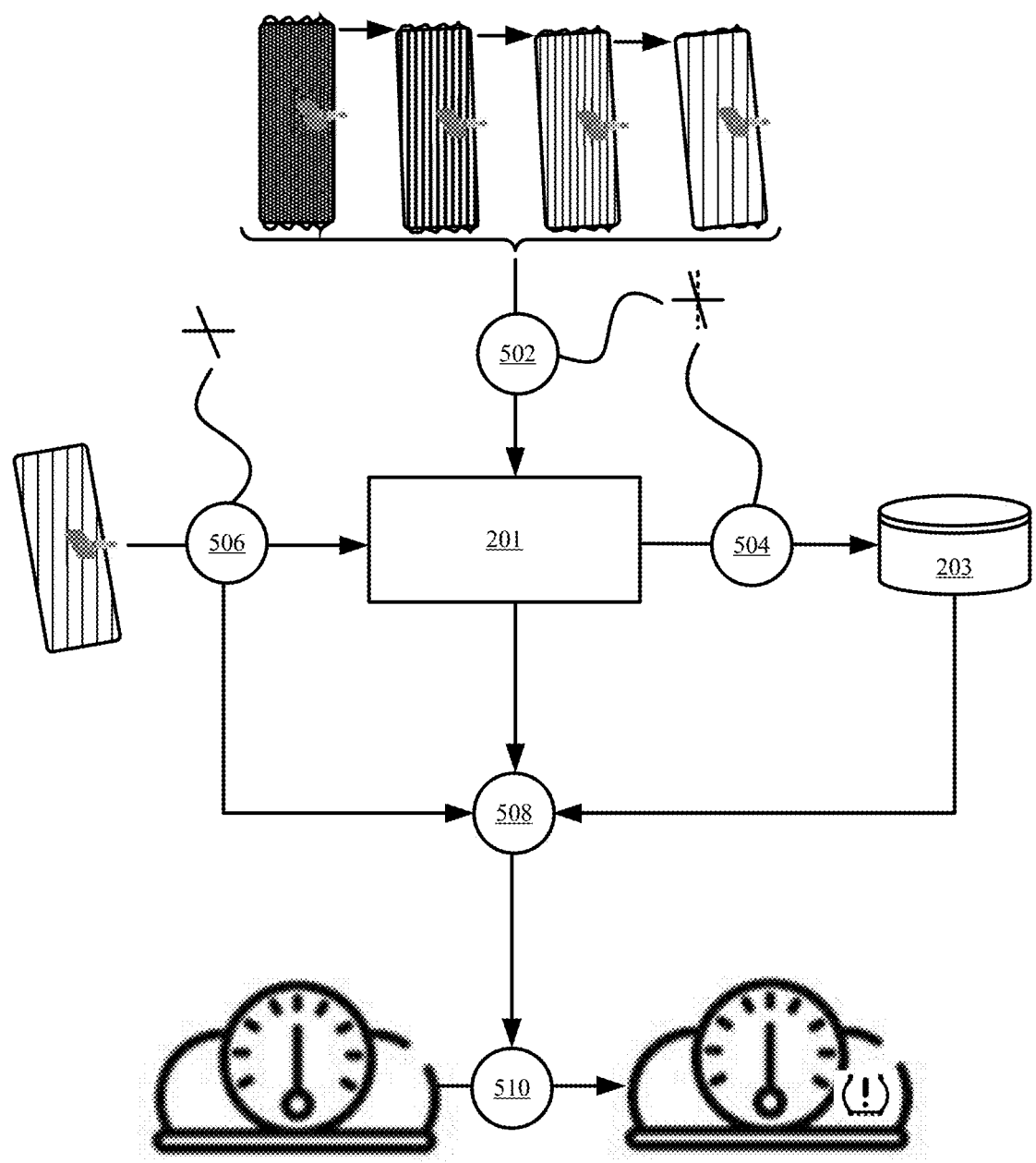
FIG. 5 illustrates an example of monitoring tire tread based on measurements from a wheel-integrated monitoring device in accordance with some embodiments presented herein.

FIG. 5 illustrates an example of monitoring tire tread based on measurements from wheel-integrated monitoring device 100 in accordance with some embodiments presented herein. Controller 201 receives (at 502) measurements generated by sensors of a specific wheel-integrated monitoring device 100 over time, and stores (at 504) the measurements to non-volatile storage medium 203. Controller 201 also receives (at 506) current measurements generated by sensors of the specific wheel-integrated monitoring device 100, and compares (at 508) the current measurements to the stored measurement to detect changes in one or more of the measurements. For instance, controller 201 may determine that the angle, height, or position of the wheel changes over time, and the amount of change may correspond to an amount of tire wear. Similarly, controller 201 may measure the vehicle drifting in one direction based on the received (at 502 and 506) measurements, and may determine that the amount of drift correlates to an amount of wear on the tire. In some embodiments, controller 201 may determine the remaining tire tread based on changes in the traction of the tires. For instance, gas mileage of the vehicle may decrease or additional rotations of the tire may be needed to travel a particular distance (e.g., acceleration of the vehicle changing for the same number of wheel rotations). Wheel-integrated monitoring device 100 may measure these changes, and controller 201 may compute changes in the tire tread based on the measured changes.

In response to determining that the tire tread is worn past a safe amount, controller 201 generates (at 510) a warning on the vehicle dashboard or console to notify the driver of condition. Specifically, controller 201 may activate a low tread warning light or indicator on the dashboard or vehicle console. The driver or a mechanic may measure the tire tread themselves and deactivate the warning light or indicator if the remaining tread is within acceptable limits, or may replace the tires to reset the warning light or indicator.

The measured driving characteristics from which the various warnings or alerts are generated may be stored in non-volatile storage medium 203 and/or may be wirelessly downloaded from monitoring system 200 to a device of a mechanic so that the mechanic may immediately identify and remedy the issue. Specifically, the mechanic may download the driving characteristics and may immediately perform adjustments to various vehicle components without having to manually diagnose and/or recreate the issues.

Figure 6:
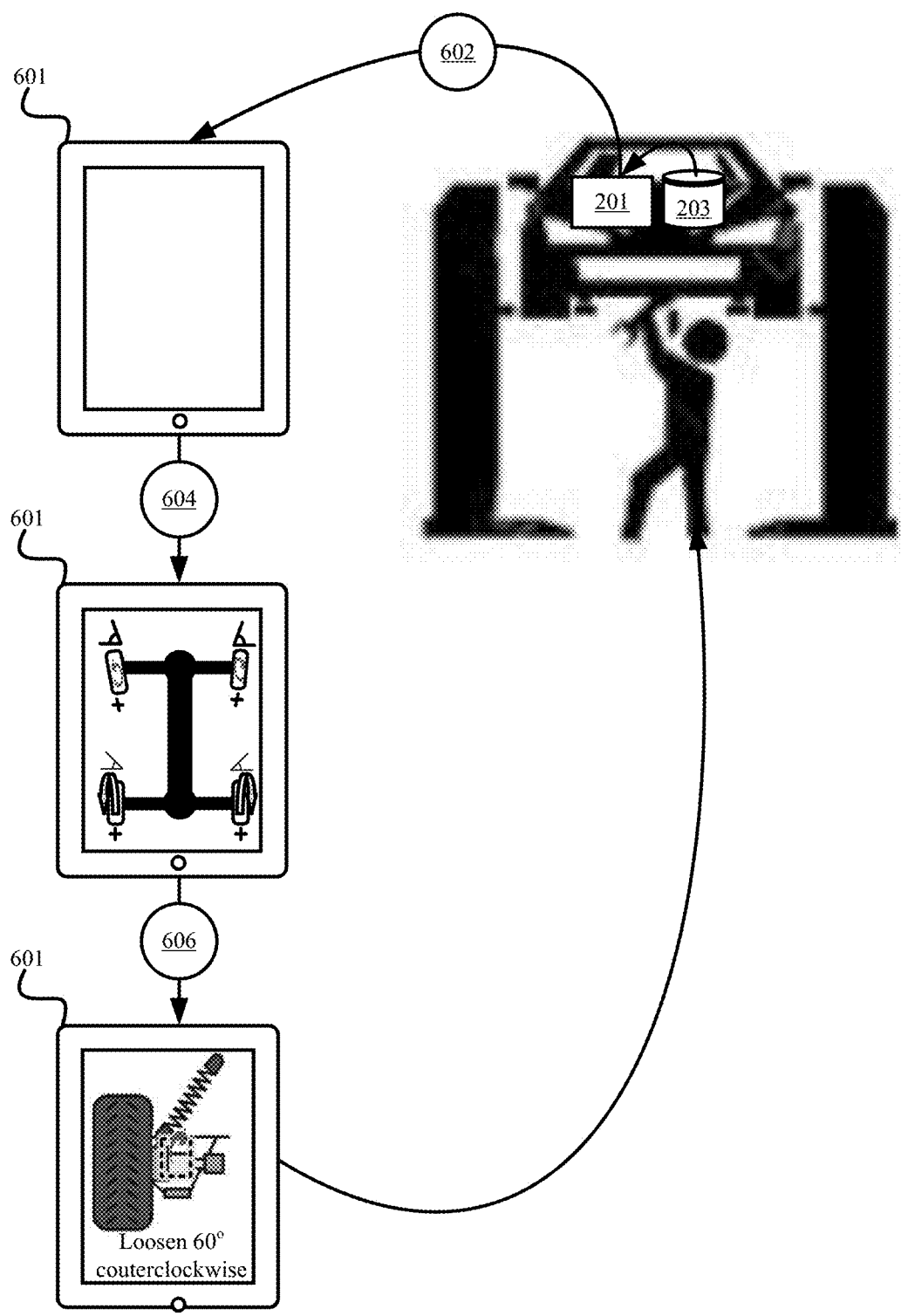
FIG. 6 illustrates an example of tuning a vehicle based on the driving characteristics measurements that are derived from or generated from the wheel-integrated monitoring devices in accordance with some embodiments presented herein.

FIG. 6 illustrates an example of tuning a vehicle based on the driving characteristics measurements that are derived from or generated from wheel-integrated monitoring devices 100 in accordance with some embodiments presented herein. The measurements generated by wheel-integrated monitoring devices 100 and/or the derived driving characteristics produced by controller 201 from the generated measurements may be downloaded (at 602) to user device 601. User device 601 may include a network-enabled computing device such as a tablet, smartphone, laptop computer, desktop computer, or headset. User device 601 may establish a wireless connection with controller 201, request the stored measurements and/or driving characteristics from non-volatile storage medium 203, and download (at 602) the stored measurements and/or driving characteristics over the established wireless connection.

User device 601 may generate (at 604) a visualization to illustrate the driving characteristics. For instance, user device 601 may present a visualization for the measured wheel's arc-of-rotation, angle, orientation, and position of each wheel, or may present deviations between manufacturer or vehicle defined specifications or accepted tolerances and the downloaded measurements or driving characteristics. In some embodiments, user device 601 may also receive diagnostics that are generated by diagnostic equipment at the mechanic shop while the vehicle is stationary. User device may compare the measurements from each wheel-integrated monitoring device 100 to the diagnostics taken while the vehicle is stationary, and generating (at 604) the visualization may include illustrating the differences in driving characteristics resulting from the actual driving conditions and from the diagnostic equipment at the mechanic shop.

User device 601 may also present (at 606) adjustments to specific vehicle components for restoring the driving characteristics to the manufacturer or vehicle defined specifications or acceptable tolerances. Controller 201 may define the adjustments from the generated measurements and/or driving characteristics. Alternatively, user device 601 may execute an application that determines wheel alignment or other issues based on the downloaded (at 602) data, and generates the adjustments based on manufacturer or vehicle repair guidelines.

In some embodiments, user device 601 may include a virtual reality, mixed reality, augmented reality, or other spatial computing device that overlays the visualization of the measurements onto actual images of each vehicle wheel or that overlays the adjustments onto the actual vehicle components. This allows the user to visualize the issues while working on the vehicle.

Controller 201 may dynamically define adjustments for each vehicle according to optimizations that controller 201 may make or apply to manufacturer or vehicle recommended specifications or acceptable tolerances based on the wheel-integrated monitoring device 100 generated measurements and/or determined driving characteristics. In other words, controller 201 may dynamically define the adjustments to tune the driving characteristics to slightly differ from the manufacturer or vehicle recommended specifications or acceptable tolerances. This is because the manufacturer or vehicle recommended specifications or acceptable tolerances are often optimized for a single driver load, new tires (e.g., full tread), and normal driving behavior. However, the measurements generated by wheel-integrated monitoring devices 100 may indicate different loads on the vehicle, different tire conditions, and/or different driving behaviors. Controller 201 may account for these differences when defining the adjustments to the vehicle driving characteristics so that the vehicle performance (e.g., traction, fuel efficiency, etc.) improves and/or tire wear is reduced relative to tuning the driving characteristics solely based on the manufacturer or vehicle recommended specifications or acceptable tolerances.

Stated differently, since the driving characteristics are measured under actual driving loads and conditions, controller 201 may dynamically determine the vehicle adjustments for correcting wheel alignment and/or other driving characteristic deviations rather than have the mechanic set the wheel alignment and/or other driving characteristics for all vehicles of the same make and model exactly to the manufacturer or vehicle specifications. The dynamic wheel alignment may compensate for different amounts of wear on the tires of each vehicle, for different average loads on each vehicle, and/or for different driver behavior associated with vehicle. For instance, deviating from the manufacturer or vehicle specified camber, caster, or toe in response to the different tire wear, average loads, and/or different driver behavior may reduce wear on the tire, improve gas mileage, provide better traction and/or performance, and/or improve other driving characteristics of the vehicle than if the wheels were aligned exactly to the manufacturer or vehicle specified camber, caster, or toe.

Figure 7:
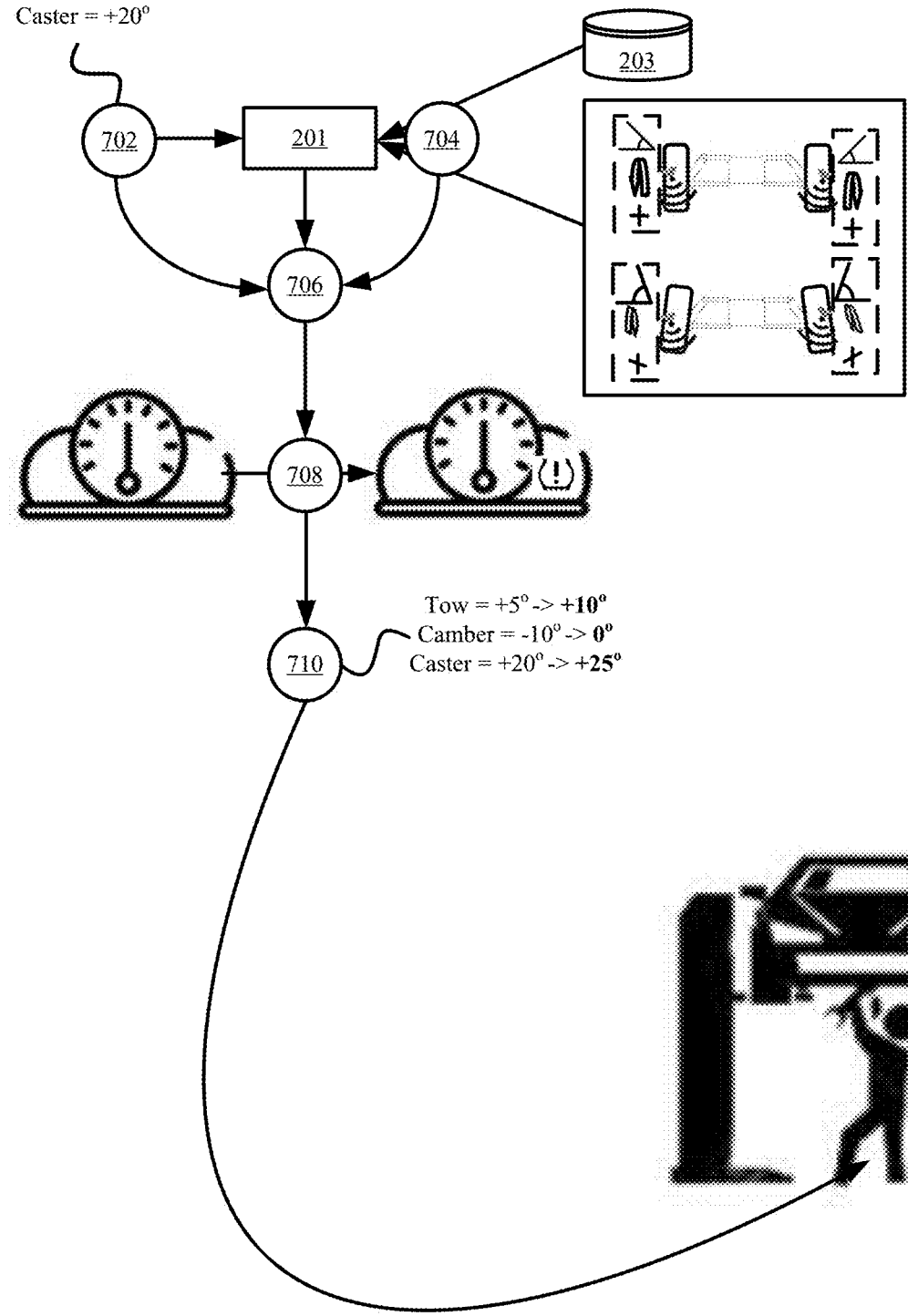
FIG. 7 illustrates an example of dynamic wheel alignment that is defined based on measurements of the wheel-integrated monitoring devices in accordance with some embodiments presented herein.

FIG. 7 illustrates an example of dynamic wheel alignment that is defined based on measurements of wheel-integrated monitoring devices 100 in accordance with some embodiments presented herein. Controller 201 is configured (at 702) with manufacturer or vehicle specifications for wheel alignment for the vehicle make and model on which controller 201 is installed. For instance, the manufacturer may specify a specific amount of toe, camber, and caster for the wheels of every vehicle of that make and model it manufacturers.

Controller 201 receives (at 704) the driving characteristics of the vehicle from wheel-integrated monitoring devices 100. More specifically, controller 201 receives (at 704) the current driving characteristics and past driving characteristics measured by wheel-integrated monitoring device 100.

Controller 201 compares (at 706) the driving characteristics of the vehicle that are measured by wheel-integrated monitoring devices 100 to the manufacturer or vehicle specifications, and determines that the vehicle is in need of alignment in response to the driving characteristics deviate from the manufacturer or vehicle specifications by more than a threshold amount. Controller 201 generates (at 708) an alert to notify the driver that the wheels are out of alignment.

Controller 201 computes (at 710) custom values for the camber, caster, and toe of the vehicle based on the manufacturer or vehicle specifications as modified for the vehicle's tracked driving characteristics. The tracked driving characteristics include the current measurements generated by wheel-integrated monitoring devices 100 and historical measurements stored in non-volatile storage medium 203.

In some embodiments, controller 201 computes (at 710) the custom values by accounting for tread wear on the tires, average load with which the vehicle is driven, and driving behavior of the user. The tread wear, average load, and driving behavior are driving characteristics that may be measured or derived based on the data collected and reported by wheel-integrated monitoring devices 100. For instance, the tread wear may be measured based on the changing height, angle, tilt, orientation, and/or position of the wheels over time. More specifically, tires may experience more wear along the inner or proximal tread and less wear along the outer or distal tread. Alternatively, the height of the tire may be reduced by one or more millimeters as the tire tread is worn. The average load may also be measured based on the changing height, angle, tilt, orientation, and/or position of the wheels when the vehicle is driven with different loads. For instance, the wheel camber may change based on the vehicle weight. Also, the inner tread of the tires or the entirety of the tires may wear at a faster rate when the vehicle is more heavily loaded. The driving behavior may be measured based on how fast the vehicle accelerates and/or travels on average. These measurements may be derived from the accelerometer and/or the speed by which the wheel rotations change over time.

In some embodiments, the custom values computed (at 710) by controller 201 may be based on the manufacturer or vehicle specifications corresponding to an optimal wheel alignment when the vehicle has a particular load (e.g., one average weight driver and the vehicle having a full tank of gas) and the tires are new (e.g., no wear on the tire tread). Controller may adjust (e.g., increase or decrease) one or more of the manufacturer or vehicle specified camber, caster, or toe values based on a deviation between the actual measured load and the load used in the manufacturer or vehicle specifications and/or based on a deviation between computed remaining tire tread and new tires with no tread.

In some other embodiments, controller 201 computes (at 710) the custom values for the wheel alignment directly from the determined driving characteristics of vehicle load and tire wear. For instance, controller 201 may specify a positive camber and a toe out for the alignment when the measurements indicate greater wear on the inner tread of the tire than the outer tread of the tire or when the vehicle is more heavily loaded on average.

Similarly, the driving behavior may be considered when computing (at 710) the custom values for the wheel alignment. For instance, an aggressive driver that accelerates quickly and drives at high speeds may require better traction at the expense of faster tire wear. Accordingly, controller 201 may specify a negative camber and positive caster for the aggressive driver, and may specify a neutral or positive camber and neutral or less positive caster for a less aggressive driver, wherein the positive camber and neutral or less positive caster may reduce tire wear and improve gas mileage for the less aggressive driver while providing an acceptable amount of traction.

In any case, controller 201 dynamically generates or adjusts wheel alignment values for each vehicle of the same make and model to optimize the wheel alignment and driving characteristics of each vehicle based on the load, tire wear, and/or driving behavior that wheel-integrated monitoring devices 100 track for that vehicle. The custom values ensures that a one-size-fits-all alignment is not performed for every vehicle of the same make and model, and that the wheel alignment is dynamically customized for each vehicle based on its unique driving characteristics at the time of alignment.

In some embodiments, controller 201 is linked to the drive control system of the vehicle, and may dynamically adjust vehicle performance. More specifically, controller 201 may control the drive motors or power distribution to the wheels in order to reduce tire wear, improve fuel efficiency, improve traction, and/or otherwise optimize the vehicle performance based on the measured driving characteristics.

Figure 8:
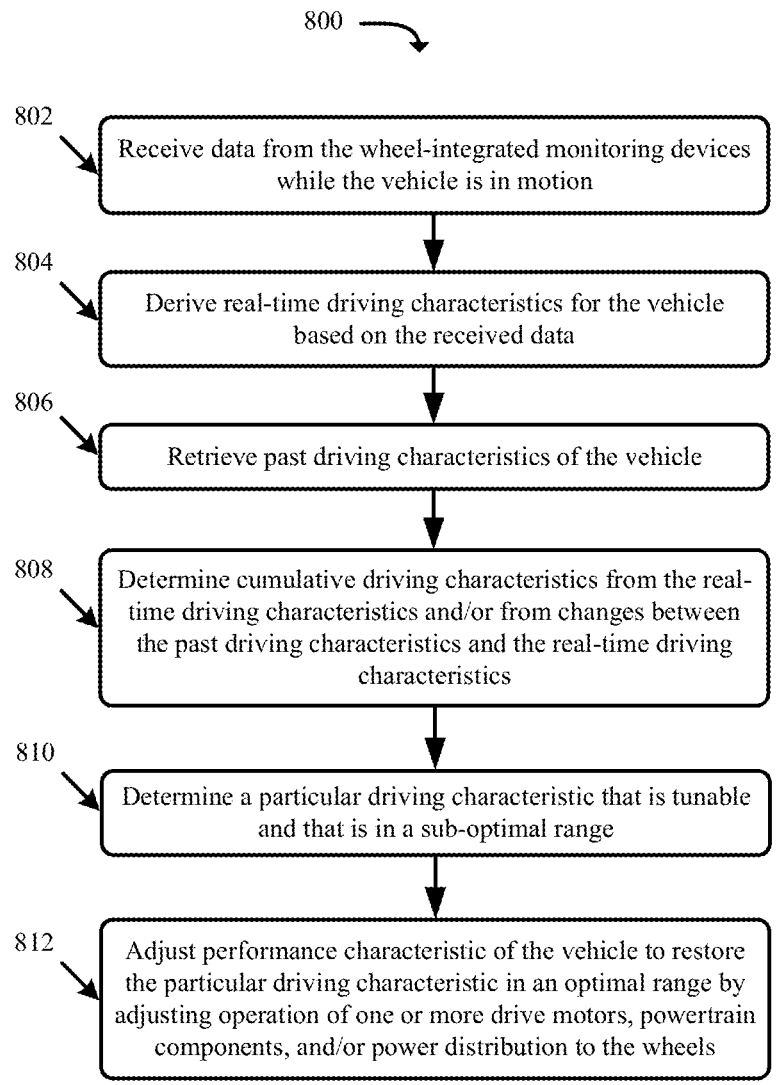
FIG. 8 presents a process for dynamically controlling vehicle performance based on the monitoring of the vehicle driving characteristics in accordance with some embodiments presented herein.

FIG. 8 presents a process 800 for dynamically controlling vehicle performance based on the monitoring of the vehicle driving characteristics in accordance with some embodiments presented herein. Process 800 is implemented by combined operation of controller 201 and wheel-integrated monitoring devices 100 and by integrating controller 201 as part of the drive control system of the vehicle that control the drive motors, power distribution to the wheels, steering performance (e.g., drive-by-wire steering systems), and other drivetrain components.

Process 800 includes receiving (at 802) data from wheel-integrated monitoring devices 100 while the vehicle is in motion. The data includes measurements for the arc-of-rotation, angle, orientation, position, and/or other properties of each wheel. The data is received by controller 201 over a wireless Bluetooth connection.

Process 800 includes deriving (at 804) real-time driving characteristics for the vehicle based on the received (at 802) data from wheel-integrated monitoring devices 100. The real-time driving characteristics may include measurements for the current load on the vehicle, wear pattern on the tires, the current positioning, tilt, and/or orientation of the wheels to the ground or road, and/or tire traction.

Process 800 includes retrieving (at 806) past driving characteristics of the vehicle. The past driving characteristics are stored to the non-volatile storage medium 203, and may loaded into the memory of controller 201 along with the real-time driving characteristics.

Process 800 includes determining (at 808) cumulative driving characteristics from the real-time driving characteristics and/or from changes between the past driving characteristics and the real-time driving characteristics. For instance, some driving characteristics, such as tire tread wear, may require a point of reference that is established using the past driving characteristics, and are computed based on changes from that point of reference. Other driving characteristics, such as the average load of the vehicle, are determined from multiple measurements taken for that driving characteristics over a period of time rather than a single measurement.

Process 800 includes determining (at 810) a particular driving characteristic that is tunable and that is in a sub-optimal range. A tunable driving characteristic is one that may be dynamically adjusted by modifying operation or control of the vehicle drive motors and/or other drivetrain components. In some embodiments, the sub-optimal range is determined from manufacturer or vehicle defined specifications or acceptable tolerances. The particular driving characteristic may be in the sub-optimal range when it differs from the manufacturer or vehicle defined specifications or acceptable tolerances by more than a threshold amount. In some embodiments, the sub-optimal range is determined based on the particular driving characteristic changing by more than a threshold amount from a point of reference established for that particular driving characteristic or an optimal value. For instance, controller 201 may determine that the tire tread has worn past a particular amount.

Process 800 include adjusting (at 812) performance characteristic of the vehicle to restore the particular driving characteristic in an optimal range. Adjusting (at 812) the performance characteristic may include adjusting operation of one or more drive motors, powertrain components, and/or power distribution to the wheels. For example, controller 201 may determine that the tires have excessive wear and that traction is reduced as a result. Accordingly, controller 201 may reduce the throttle or torque response of the vehicle when the accelerator is pressed to prevent the wheels from slipping. As another example, controller 201 may provide more power to the rear wheels than the front wheels in response to detecting that the vehicle is overloaded with the additional power to the rear wheels reducing tire tread wear on the front the wheels, thereby prolonging the tire life.

Figure 9:
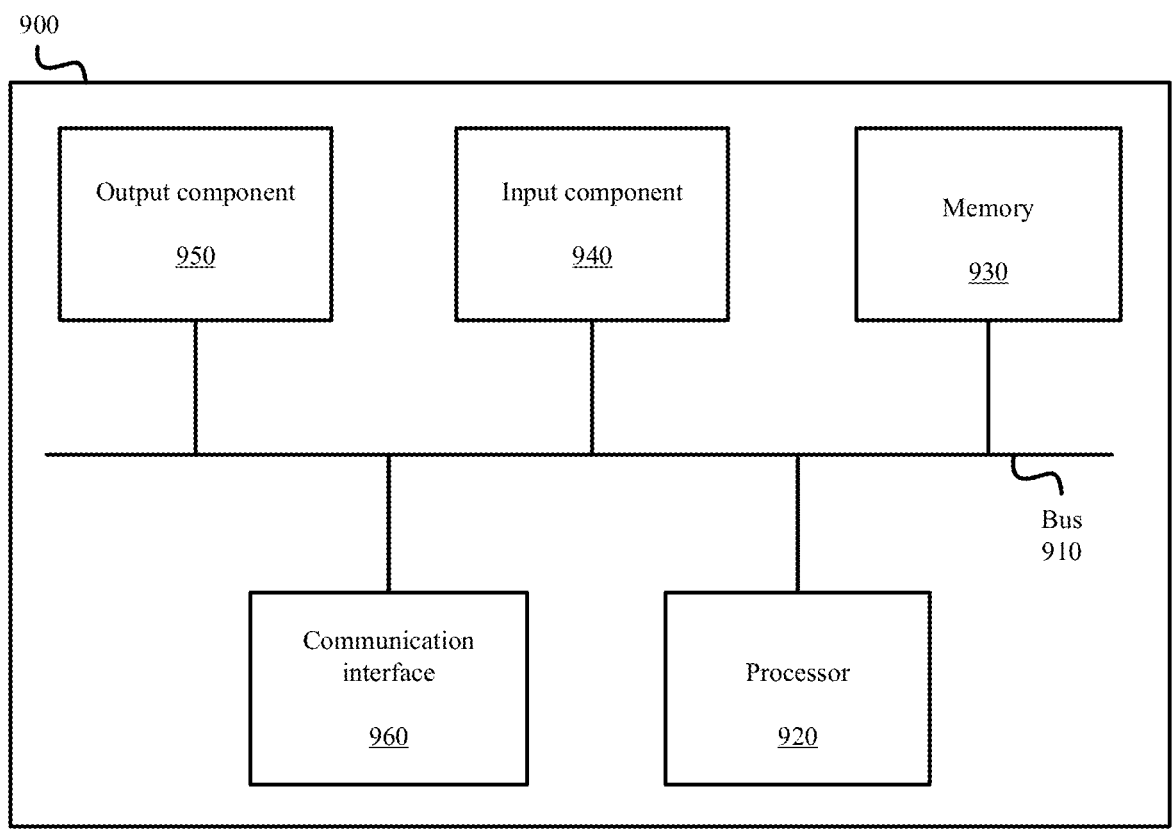
FIG. 9 illustrates example components of one or more devices, according to one or more embodiments described herein.

FIG. 9 is a diagram of example components of device 900. Device 900 may be used to implement one or more of the devices or systems described above (e.g., wheel-integrated monitoring device 100, controller 201, monitoring system 200, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/of" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A vehicle monitoring system comprising:
    a wheel-integrated monitoring device disposed between a wheel of a vehicle and a tire that is mounted to the wheel of the vehicle, the wheel-integrated monitoring device monitoring driving characteristics of the vehicle, the wheel-integrated monitoring device comprising:
        a protective housing that extends to an interior of the tire from a strainer valve of the tire;
        a printed circuit board within the protective housing that extends to the interior of the tire, the printed circuit board comprising:
            a plurality of sensors comprising two or more of an inertial measurement unit, an accelerometer, or a gyroscope that generate a plurality of measurements from the interior of the tire during each rotation of the wheel; and
            a transceiver wirelessly transmitting the plurality of measurements; and
        a power unit providing power to the plurality of sensors and the transceiver.

2. The vehicle monitoring system of claim 1, wherein the plurality of sensors further comprises a positional sensor that measures a position of the wheel.

3. The vehicle monitoring system of claim 1, wherein the plurality of measurements comprise two or more of a first measurement of an arc-of-rotation of the wheel, a second measurement of acceleration, a third measurement of angular velocity, or a fourth measurement of an orientation of the wheel.

4. The vehicle monitoring system of claim 1 further comprising:
    a controller comprising one or more hardware processors and a transceiver that receives the plurality of measurements from the wheel-integrated monitoring device.

5. The vehicle monitoring system of claim 4, wherein the one or more hardware processors are configured to:
    generate an alert on a dashboard or console in response to the plurality of measurements capturing a driving characteristic that differs from a manufacturer or vehicle defined specification by a threshold amount.

6. The vehicle monitoring system of claim 4, wherein the one or more hardware processors are configured to:
    receive a manufacturer or vehicle specification that is defined according to a first load on the vehicle and a first driving behavior;
    determine a second load on the vehicle and a second driving behavior based on one or more of the plurality of measurements;
    generate a custom specification by adjusting the manufacturer or vehicle specification according to a difference between one or more of the first load and the second load or the first driving behavior and the second driving behavior; and
    generate an adjustment to one or more vehicle components based on the custom specification.

7. The vehicle monitoring system of claim 4, wherein the one or more hardware processors are configured to:
    receive wheel alignment specifications defined by a manufacturer for one or more expected driving characteristics;
    determine a particular driving characteristic based on the plurality of measurements that differs from the one or more expected driving characteristics; and
    define custom wheel alignment values that differ from the wheel alignment specifications defined by the manufacturer based on a difference between the particular driving characteristic and the one or more expected driving characteristics, wherein the custom wheel alignment values specify one or more of a first camber, toe, or caster value that differs from a second camber, toe, or caster value specified by the manufacturer.

8. The vehicle monitoring system of claim 7, wherein the one or more hardware processors are further configured to:
present the custom wheel alignment values on a user device.

9. The vehicle monitoring system of claim 4 further comprising:
a non-volatile storage medium storing past measurements generated by the wheel-integrated monitoring device; and
wherein the one or more hardware processors are configured to:
determine tread wear on the tire based on changes from the past measurements to the plurality of measurements; and
activate an indicator in response to determining the tread wear exceeds a threshold amount.

10. The vehicle monitoring system of claim 4 further comprising:
a non-volatile storage medium storing past measurements generated by the wheel-integrated monitoring device; and
wherein the one or more hardware processors are configured to:
compute an average load on the tire based on the past measurements and the plurality of measurements; and
define custom wheel alignment values for the wheel that differ from manufacturer specified wheel alignment values in response to the average load differing from a load used in calculating the manufacturer specified wheel alignment values.

11. The vehicle monitoring system of claim 4, wherein the one or more hardware processors are configured to:
modify a distribution of power from one or more drive motors to the wheel based on the plurality of measurements.

12. The vehicle monitoring system of claim 4, wherein the one or more hardware processors are configured to:
determine one or more of a camber, caster, or toe of the wheel is out of alignment based on the plurality of measurements; and
generate an alert on a dashboard or console in response to determining that the one or more of the camber, caster, or toe is out of alignment.

13. A method comprising:
incorporating a wheel-integrated monitoring device between a wheel of a vehicle and a tire that is mounted to the wheel of a vehicle, the wheel-integrated monitoring device comprising:
a protective housing that extends to an interior of the tire from a strainer valve of the tire;
a printed circuit board within the protective housing that extends to the interior of the tire, the printed circuit board comprising:
a plurality of sensors comprising two or more of an inertial measurement unit, an accelerometer, or a gyroscope;
a transceiver; and
a power unit;
generating a plurality of measurements from the interior of the tire with the plurality of sensors during each rotation of the wheel; and
transmitting the plurality of measurements off the wheel-integrated monitoring device via the transceiver.

14. The method of claim 13, wherein incorporating the wheel-integrated monitoring device comprises:
coupling the wheel-integrated monitoring device to the strainer valve of the tire.

15. The method of claim 13 further comprising:
receiving the plurality of measurements at a controller; and
generating an alert on a dashboard or console in response to the plurality of measurements capturing a driving characteristic that differs from a manufacturer or vehicle defined specification by a threshold amount.

16. The method of claim 13 further comprising:
receiving the plurality of measurements and a manufacturer or vehicle defined specification that is defined according to a first load on the vehicle and a first driving behavior at a controller;
determining a second load on the vehicle and a second driving behavior based on one or more of the plurality of measurements;
generating a custom specification by adjusting the manufacturer or vehicle specification according to a difference between one or more of the first load and the second load or the first driving behavior and the second driving behavior; and
generating an adjustment to one or more vehicle components based on the custom specification.

17. The method of claim 13 further comprising:
receiving the plurality of measurements and past measurements generated by the wheel-integrated monitoring device at a controller;
computing an average load on the tire based on the past measurements and the plurality of measurements; and
defining custom wheel alignment values for the wheel that differ from manufacturer specified wheel alignment values in response to the average load differing from a load used in calculating the manufacturer specified wheel alignment values.

18. The vehicle monitoring system of claim 1, wherein the plurality of sensors track common points along each rotation of the wheel and generate new measurements of the plurality of measurements at each common point of the common points along each rotation of the wheel.

19. The vehicle monitoring system of claim 1 further comprising:
a first wheel-integrated monitoring device disposed between a first wheel and a first tire of the vehicle; and
a second wheel-integrated monitoring device disposed between a second wheel and a second tire of the vehicle, wherein the plurality of sensors of the first wheel-integrated monitoring device generate a first plurality of measurements upon the first wheel or the first tire rotating to a particular position, and wherein the plurality of sensors of the second wheel-integrated monitoring device generate a second plurality of measurements upon the second wheel or the second tire rotating to the particular position.

20. The vehicle monitoring system of claim 1, wherein each measurement of the plurality of measurements is associated with an identifier of the wheel-integrated monitoring device, and wherein the identifier differentiates the plurality of measurements that are generated by the wheel-integrated monitoring device for a particular wheel or tire of the vehicle from measurements generated by other wheel-integrated monitoring devices for other wheels or tires of the vehicle.

\* \* \* \* \*